Sept. 22, 1931. Re. 18,208

E. R. WHEELER

AUTOMATIC TAPE CONTROLLED TRANSMISSION FOR TICKERS

Original Filed Dec. 5, 1924 7 Sheets-Sheet 1

Inventor
E. R. Wheeler

Eugene C. Brown
Attorney

Sept. 22, 1931. Re. 18,208

E. R. WHEELER

AUTOMATIC TAPE CONTROLLED TRANSMISSION FOR TICKERS

Original Filed Dec. 5, 1924 7 Sheets-Sheet 2

Sept. 22, 1931. Re. 18,208
E. R. WHEELER
AUTOMATIC TAPE CONTROLLED TRANSMISSION FOR TICKERS
Original Filed Dec. 5, 1924 7 Sheets-Sheet 3
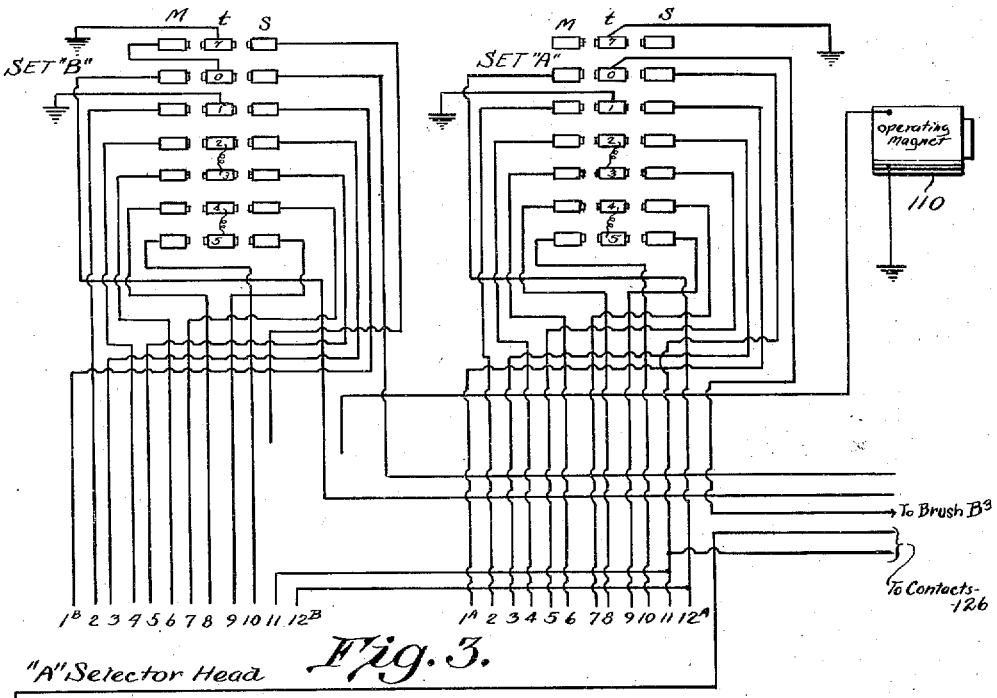
"A" Selector Head
Fig. 3.
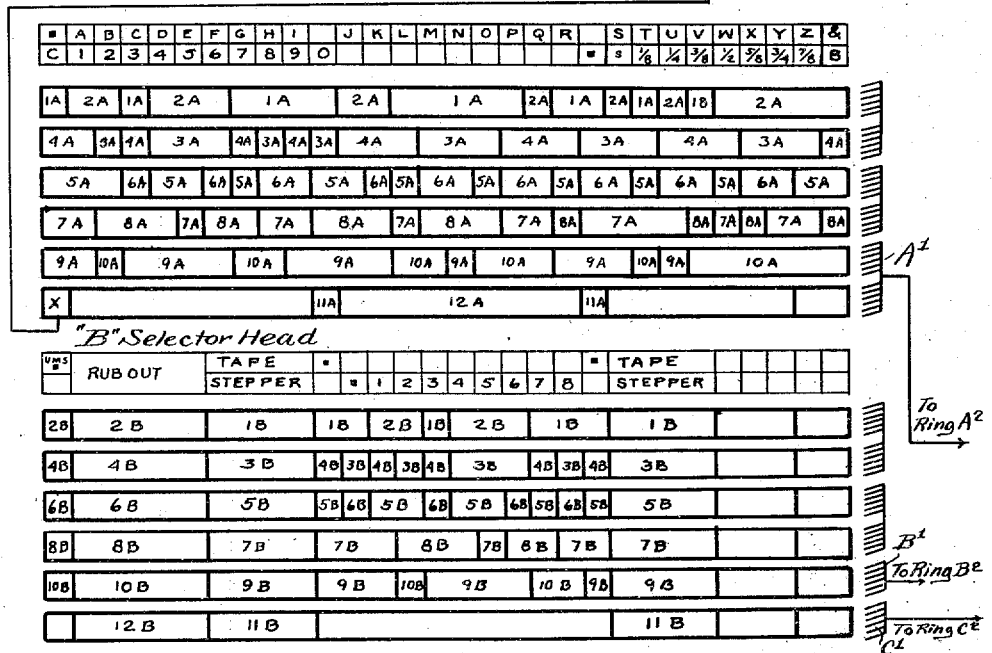
Inventor
E. R. Wheeler
Eugene C. Brown
Attorney E. R. WHEELER
AUTOMATIC TAPE CONTROLLED TRANSMISSION FOR TICKERS
Original Filed Dec. 5, 1924 7 Sheets-Sheet 4
Fig. 4.
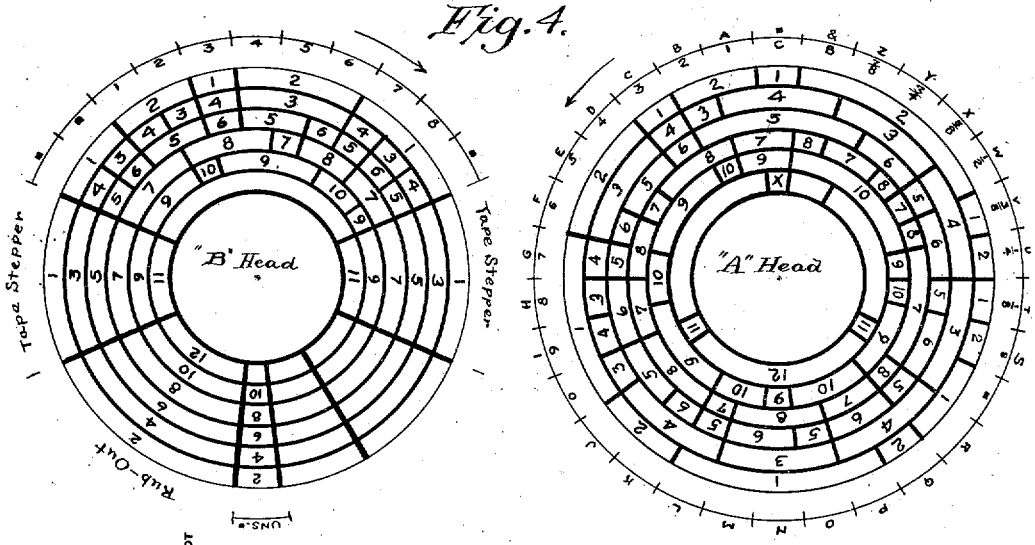
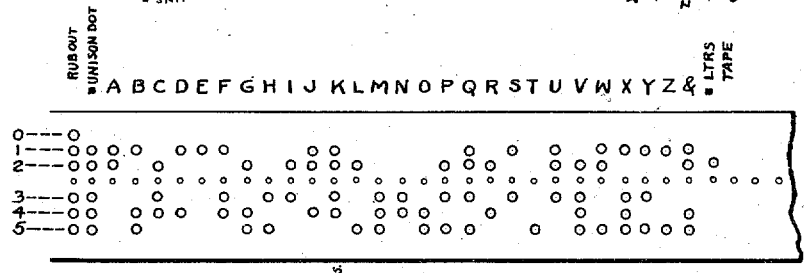
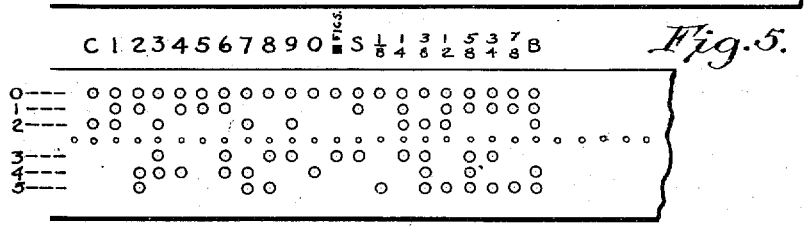
Fig. 5.
Fig. 6.
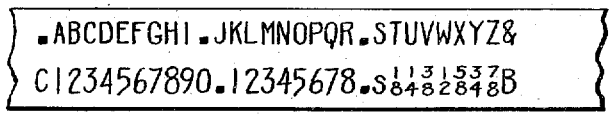
Fig. 7.
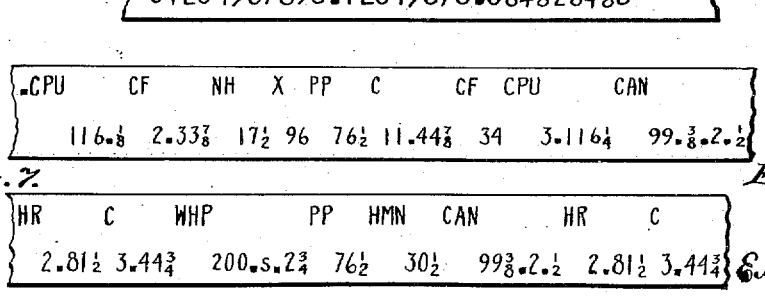
Inventor
E. R. Wheeler
Eugene C. Brown
Attorney Sept. 22, 1931. Re. 18,208
E. R. WHEELER
AUTOMATIC TAPE CONTROLLED TRANSMISSION FOR TICKERS
Original Filed Dec. 5, 1924 7 Sheets-Sheet 5
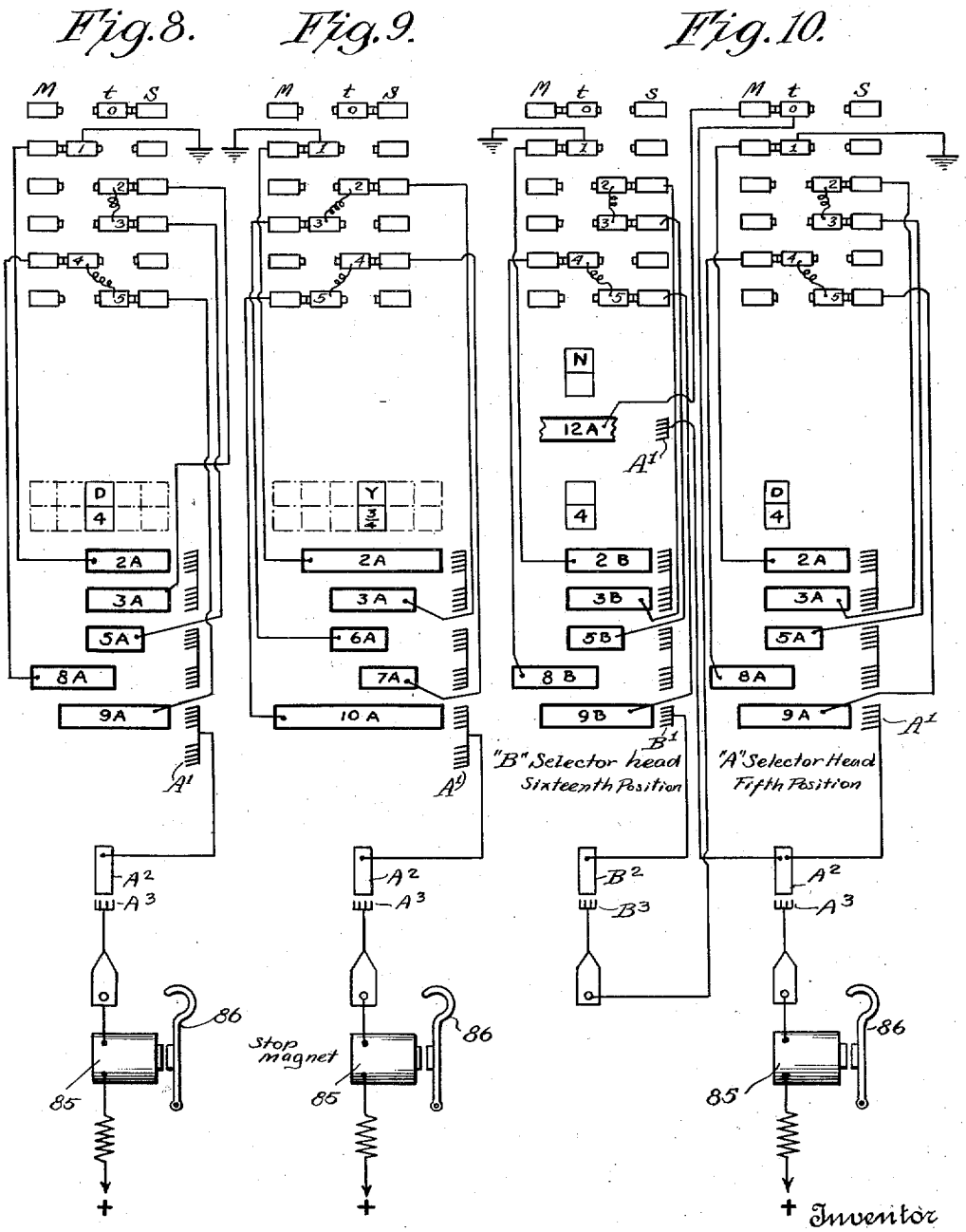
Inventor
E. R. Wheeler
Eugene C. Brown
Attorney Sept. 22, 1931. Re. 18,208

E. R. WHEELER

AUTOMATIC TAPE CONTROLLED TRANSMISSION FOR TICKERS

Original Filed Dec. 5, 1924 7 Sheets-Sheet 6

Inventor
E. R. Wheeler

Eugene C. Brown
Attorney

E. R. WHEELER

AUTOMATIC TAPE CONTROLLED TRANSMISSION FOR TICKERS

Original Filed Dec. 5, 1924 7 Sheets-Sheet 7

Inventor
E. R. Wheeler

Eugene C. Brown
Attorney

Reissued Sept. 22, 1931

Re. 18,208

UNITED STATES PATENT OFFICE

EVAN R. WHEELER, OF NORTH PLAINFIELD, NEW JERSEY, ASSIGNOR TO THE WESTERN UNION TELEGRAPH COMPANY, OF NEW YORK, N. Y., A CORPORATION OF NEW YORK

AUTOMATIC TAPE CONTROLLED TRANSMISSION FOR TICKERS

Original No. 1,765,042, dated June 17, 1930, Serial No. 754,188, filed December 5, 1924. Application for reissue filed November 6, 1930. Serial No. 493,872.

This invention relates to improvements in the method of transmitting and receiving quotations and in the apparatus and circuit arrangements therefor.

As is known by those familiar with the operation of quotation or other ticker systems, in the method heretofore employed for the transmission of characters, the operator, by the manipulation of keys on a keyboard, controls the ticker transmitter directly by means of electrical circuits from the various keys of the keyboard to the transmitter. In the system herein described the characters to be transmitted are first transcribed by the operator by means of a keyboard perforator upon a tape in telegraphic code and the perforated tape is then fed through a tape transmitter which, in conjunction with a ticker transmitter, controls the character impulses sent over the lines to the so-called "tickers" at the broker's or other receiving offices.

Figure 1:
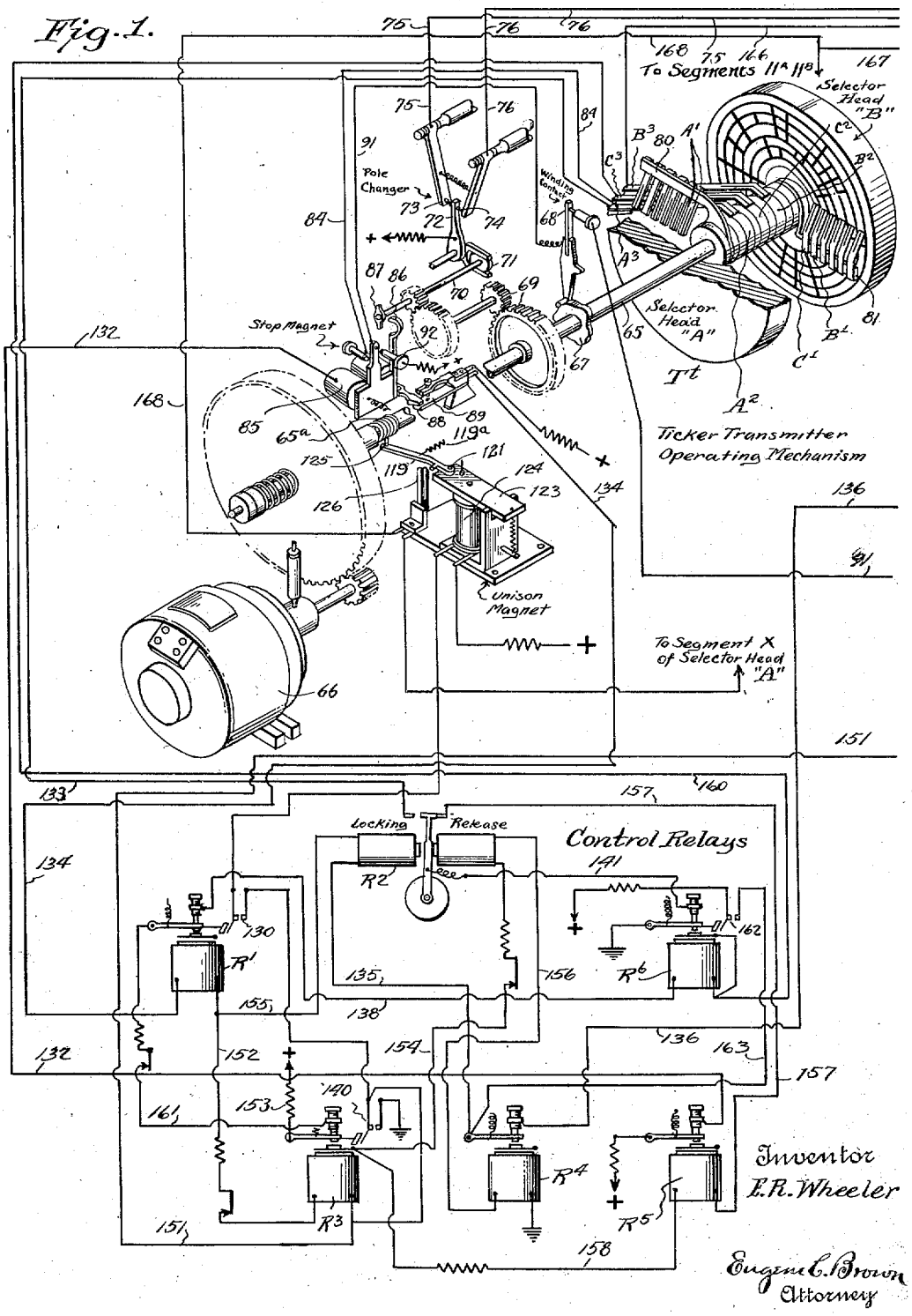
Figure 2:
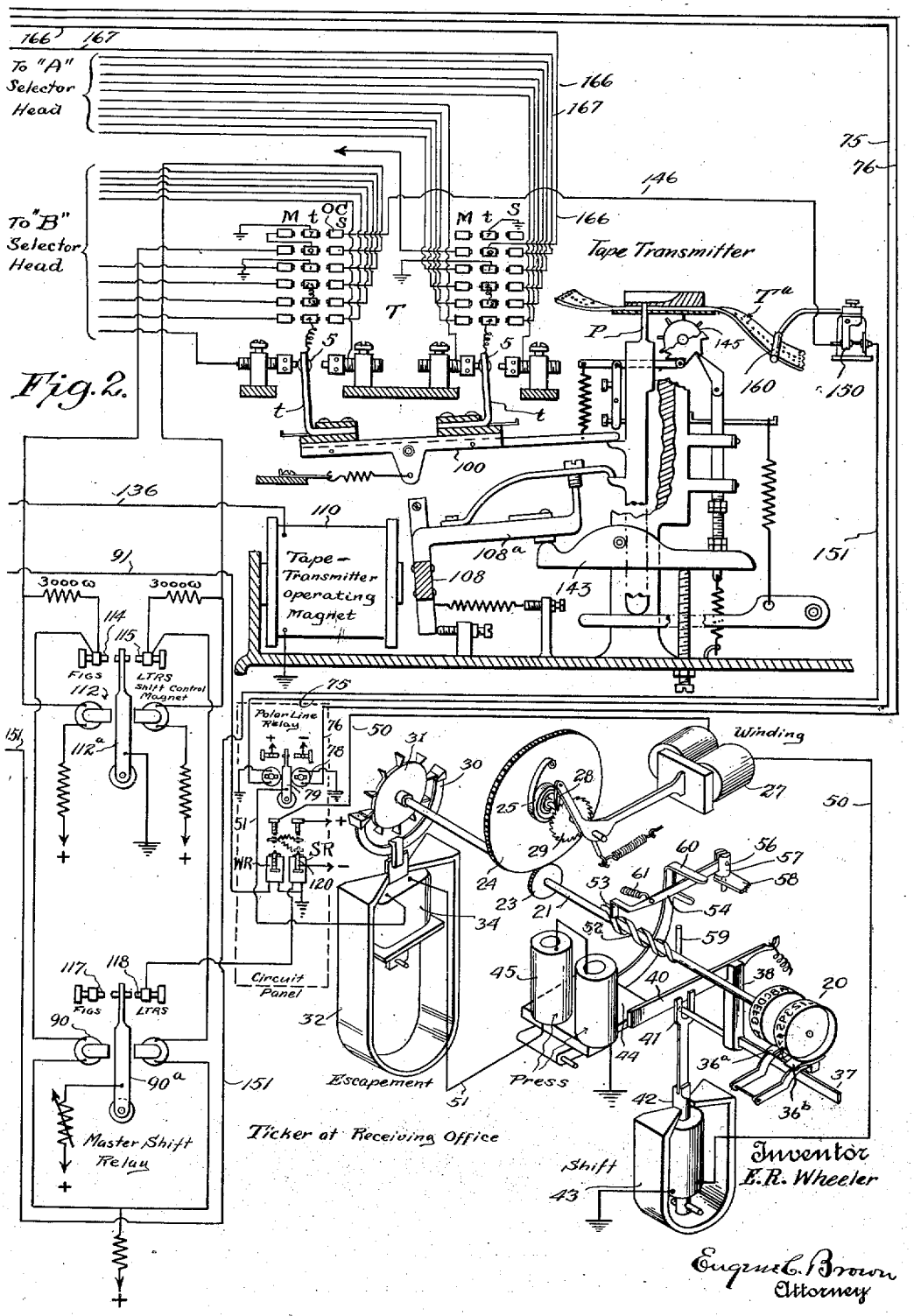
Figures 11, 12:
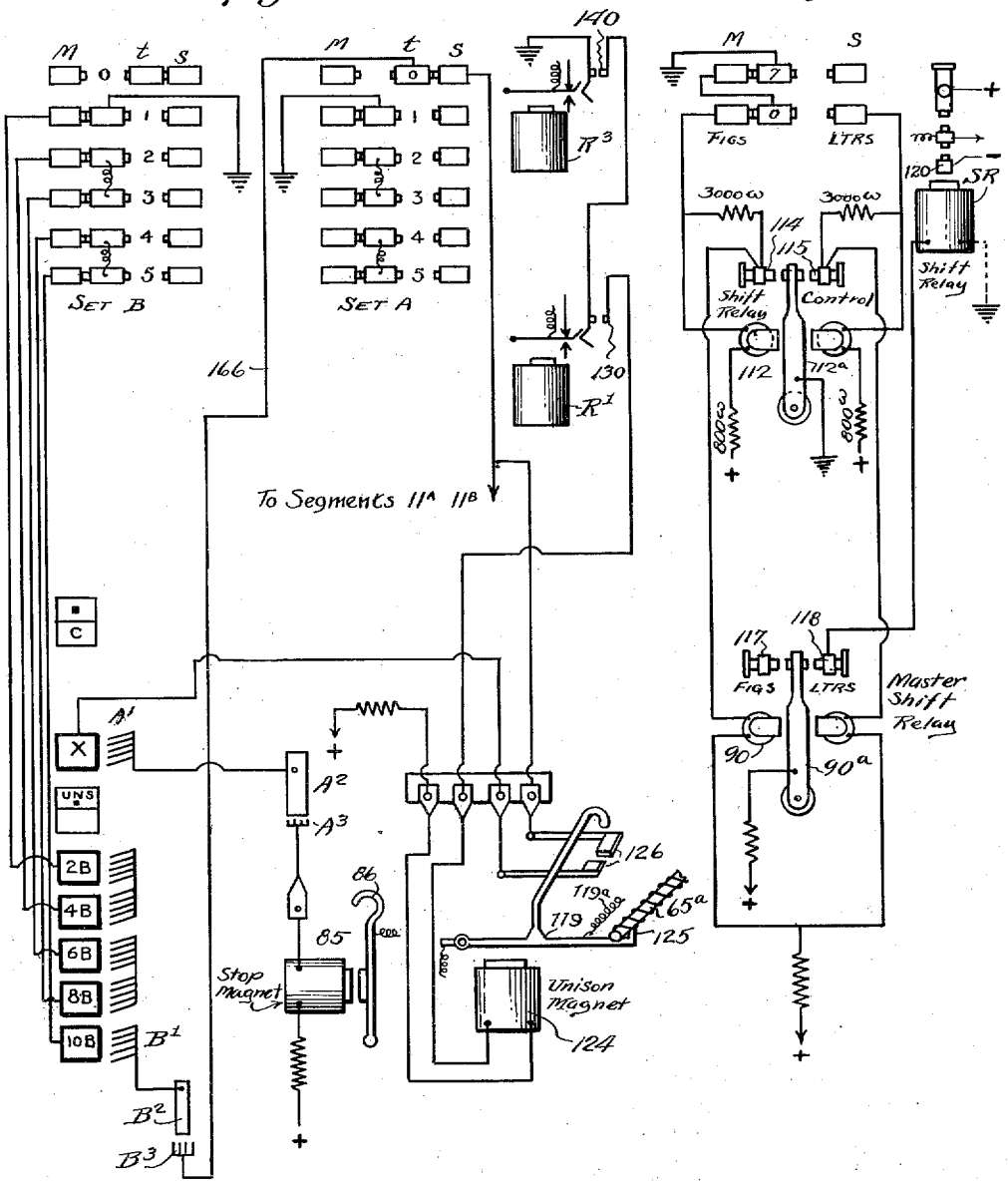
Figure 13:
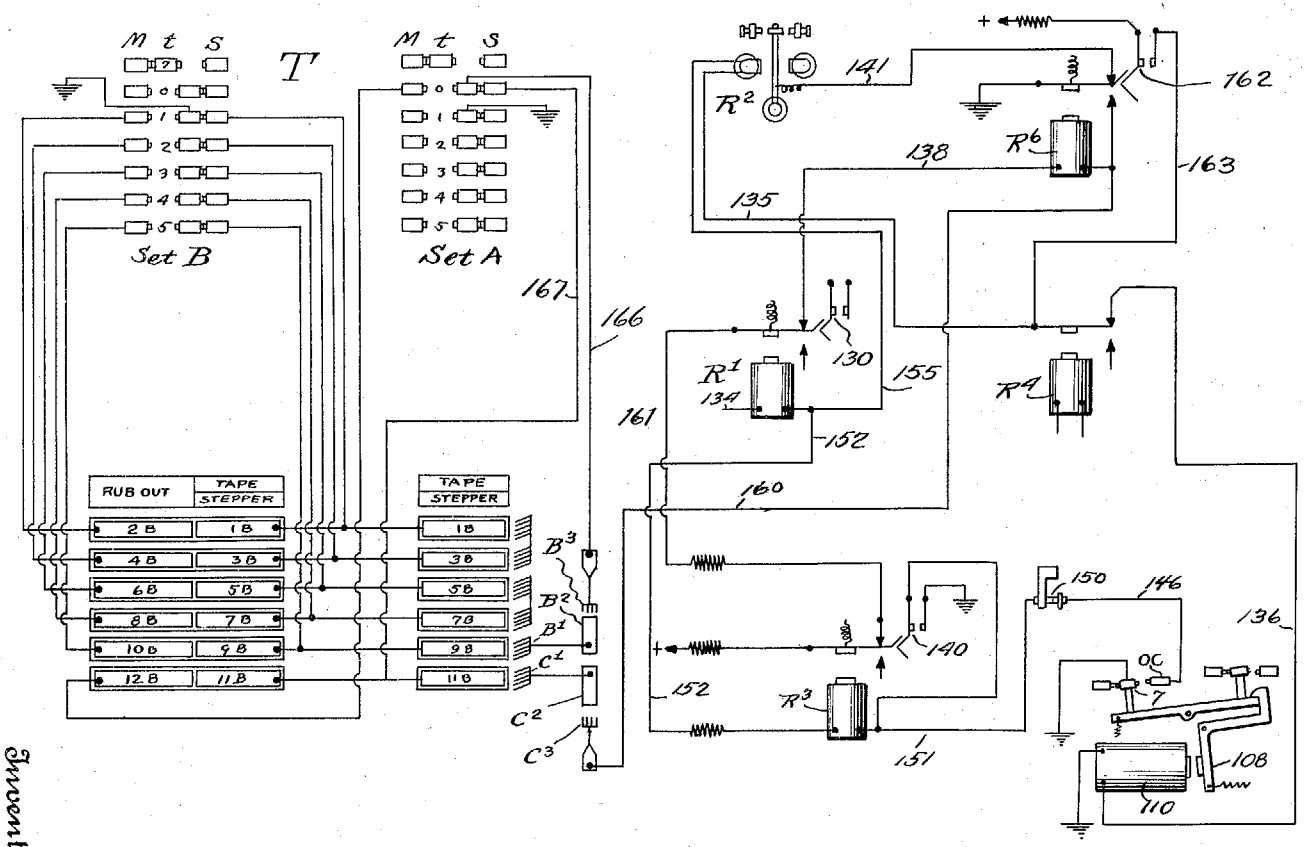

I can best explain the several features of my invention in connection with the accompanying drawings in which—Figures 1 and 2, taken together, illustrate apparatus at the transmitting and receiving stations for carrying out my automatic stock ticker transmission system; Fig. 3 is an illustrative diagram of the circuits connecting the contacts of the tape transmitter with the segments of the selector heads, the latter being shown in developed form; Fig. 4 shows a face view of the selector heads; Fig. 5 shows the alphabet and figures as they appear when punched in the tape in telegraphic code characters; Fig. 6 shows the order or arrangement of characters on the face of the typewheel of the ticker when developed; Fig. 7 illustrates a specimen of a stock ticker tape; Fig. 8 illustrates the selection circuits for the letter D; Fig. 9 illustrates the circuits for the letter Y; Fig. 10 illustrates the selection circuits on the two selector heads when the same character is duplicated; Fig. 11 shows the circuits for the unison function; Fig. 12 shows the circuits for the controlling of the shift to letters or to figures; and Fig. 13 shows the circuits for operating the tape stepper function.

There are usually a number of "ticker" recorders on the same circuit controlled by a relay at the transmitting station, the relays being positioned upon circuit panels. The "tickers" are self-winding and operate continuously to print the market quotations upon the recording tape. The function of the automatic system disclosed herein is to cause the ticker transmitter to stop at the correct point or position in its rotation corresponding to the character which it is desired to print, to hold it stationary for a definite interval, meanwhile preparing the next succeeding character selection and then releasing the transmitter and allowing it to rotate to the next character position.

The essential features of the self-winding ticker are shown in the lower right hand portion of Fig. 2. This will be recognized as the well-known step-by-step type of receiving printer usually found in broker's offices and commonly designated as a "ticker". A type-wheel 20, made in two sections, is secured to shaft 21. One section of the type-wheel carries upon its periphery thirty letter characters and the other section carries thirty figure characters, the characters on the two sections being in exact alinement. The order in which the characters appear on the type-wheel is shown in Fig. 6. I have illustrated in Fig. 7, a section of stock ticker tape showing how the market quotations appear on the printed tape as it leaves the ticker.

The type-wheel shaft 21 carries a pinion 23 in mesh with a gear 24 connected to a clock spring 25 which is maintained under constant tension by the winding magnet 27, acting through the pawl 28 and ratchet 29. The shaft is prevented from continuous rotation by escapement anchor 30, which engages the teeth of escapement wheel 31. The escapement anchor is controlled by the permanent magnet 32 and the coil 34. The reversals of current through the coil 34 cause the anchor to shift back and forth, each movement releasing the escapement wheel and allowing the type-wheel to rotate an amount equal to the space of one character. As the type-wheel must be rotated in this manner step by step to the character which it is desired to print the escapement magnet coil 34 must receive as many impulses, alternately positive and negative, as there are spaces between the last character printed and the next character to be printed. The driving spring 25 is maintained under approximately constant tension by the winding magnet 27, which is operated periodically by interrupting the current passing through it.

Before printing a character, it is necessary to determine whether a letter of a figure character shall be printed. Each section of the type-wheel is provided with a separate platen 36[a], 36[b] and located beneath the two platens is a shift arm 37 carried by a link 38, pivoted to the printing lever 40. The shift arm 37 rests between the prongs of a fork 41 on the upper end of pivoted armature 42 of the shift magnet 43. If a letter character is to be printed, the armature is moved to the right, thus throwing the shift arm 37 under the letters platen. When the press magnet 45 is energized immediately thereafter, the lever 40 carried by its armature 44 lifts the arm 37, which strikes the letters platen and presses the tape against the face of the type-wheel, thereby printing the character to which the type-wheel had previously been rotated. If it is desired to print a figure character, the armature 42 of the shift magnet deflects the arm 37 to the left, so that when the printing lever is raised the figures platen presses the tape against the type-wheel. After each character is printed, the tape is advanced the space of one character on the down stroke of the printing lever.

The shift magnet requires a positive or a negative current impulse, depending upon whether a letter or a figure character is to be printed. It is necessary, therefore, to send over the line 50, positive or negative current to actuate the shift magnet and also to break said impulses into regular pulsations for the purpose of operating the winding magnet 27. The press magnet, which is in the same circuit with the escapement magnet responds to current of either polarity but only operates upon a long impulse and therefore does not respond to the rapid reversals which actuate the latter. Hence on line 51, it is necessary to send rapid reversals of current of sufficient number to cause the type-wheel to rotate to the character which it is desired to print and then to prolong the last impulse of the group of reversals to energize the press magnet and print the character.

In type-wheel printing receivers of the step-by-step type it is essential that the type-wheels of all tickers on a circuit shall start at the same character, after which the type-wheels will rotate in unison with the escapement impulses passing over line 51. To this end the type-wheel shaft 21 is provided with a worm 52, which is engaged by the end 53 of an arm 54, pivotally mounted for vertical movement at 56 in a post 57, which is rotatable on a vertical pivot in its support 58. When the shaft 21 has made three revolutions without printing a character, the projection 59 at the end of the worm strikes the end of the arm 54 and stops the rotation of the shaft. This always occurs when the "letters dot," just before the letter A on the type-wheel, is in position to be printed when the press magnet 45 is energized. When the armature 44 of the press magnet is raised to print the "unison dot," a forked arm 60, attached to the armature, lifts the arm 54, disengaging it from the stop 59 and permitting the arm to be swung by its spring 61, back to initial position at the left of the worm. This releases the shaft 21 leaving it free to move step-by-step under the control of the escapement impulses. This operation of allowing the tickers to run freely during three or four revolutions, in order to position all of the ticker type-wheels at the "unison dot" is permitted at regular intervals to insure their uniformity of position.

The line impulses are transmitted to the self-winding ticker in the following manner. At the transmitting station, each group of from eight to fifteen tickers in a circuit, is operated from a single set of relays which are preferably mounted upon a circuit panel, the relays of the several groups being controlled by a ticker transmitter. As many circuit panels are provided as may be found necessary to divide the tickers into suitable groups, but all of the circuit panels are controlled from the same transmitter.

The essential features of the ticker transmitter are illustrated in the upper portion of Fig. 1. The shaft 65, driven by a uniform speed motor 66, carries a three-point cam 67, which controls the winding contact 68, and through the gearing 69, drives the shaft 70 at a speed fifteen times greater than the speed of the shaft 65. An eccentric 71 on the shaft 70, operates a pole-changer tongue 72, which is connected to positive battery. As it alternately engages contacts 73 and 74 it constitutes an impulse generator which transmits line impulses through conductors 75 and 76, respectively, to the right and left hand coils of polar line relay 78, causing the tongue 79 of the latter to follow the motion of the tongue 72. The right and left contacts of the relay 78 are connected to the positive and negative poles of the line battery and hence as the armature 79 vibrates rapid reversals of current are sent over the line 51 to the escapement and press magnets of the tickers. The actuation of the escapement magnet causes the type-wheel shaft 21 to revolve step-by-step in unison with the incoming impulses and consequently in unison with the rotation of the ticker transmitter. These rapid reversals of current do not affect the press magnet.

After the ticker transmitter and the tickers have been rotated to the position corresponding to the character which it is desired to print, the last impulse sent over the line 51 must be prolonged in order to operate the press magnet. This is accomplished by stopping the rotation of the ticker transmitter shaft for as long an interval as is required to operate the press magnets. With the shaft 65 held stationary, the pole-changer tongue 72 rests on one or the other contact, thus holding the armature 79 of the polar line relay on its corresponding contact and thereby sending out the require long impulse over the line 51.

The point at which the ticker transmitter shaft shall be stopped is determined by the location on the type-wheel of the character to be printed. The tape transmitter T, which sets up the various permutation code selections, is connected in such manner to the selector heads A and B of the ticker transmitter $T^t$, that the order of character selections on the selector heads is the same as the order of characters on the ticker type-wheel. The selector heads are composed of insulated conductor segments. The heads are stationary, while the brush-arms 80 and 81, which carry the brushes, are carried by the shaft 65. When a character selection is set up in the tape transmitter, a circuit is established at only one point in the rotation of the brushes, from ground in the tape transmitter, through certain segments in the selector heads, through brush $A^1$, ring $A^2$, brush $A^3$, through conductor 84 and stop magnets 85, conductor 132, to positive battery by way of back contact and armature of relay $R^5$. The energization of the stop magnet 85, causes the stop arm 86, carried by its armature, to engage the end of the stop clip 87, thereby stopping the rotation of both shafts 65 and 70.

As previously stated, the position of the armature 42, of the shift magnet 43, is controlled by transmitting either positive or negative current over line 50, depending upon whether a letter or a figure character is to be printed. This polarity is determined by the position of the shift relay SR on the circuit panel. This relay is controlled by the master shift relay 90, which controls the relays on all of the panels, and the master shift relay in turn is controlled by the character selection in the tape transmitter.

It will be observed that the line 50 passes through the back contact and tongue or armature of the winding relay WR, before reaching the tongue or armature of the shift relay.

When the ticker transmitter revolves freely, the cam 67 opens and closes the winding contact 68 three times per revolution of the shaft 65, thus causing the winding relay WR to alternately attract and release its tongue or armature and in turn causing the winding magnet 27 to attract and release its armature, thereby keeping the clock spring 35 wound to supply the driving force to the type-wheel shaft 21. The circuit for the winding contact 68 on the ticker transmitter passes through conductor 91 and contact 92 to positive battery, but this circuit is only closed when the stop magnet 85 is deenergized and the transmitter shaft is revolving freely. When the stop magnet is energized to stop the transmitter shaft and print a character, the circuit of the winding relay WR is therefore broken. The armature or tongue of the winding relay then falls back to its back contact and insures a circuit through the line 50 to operate the shift magnet 43 before the press magnet 45 actuates the arm 40 to print the character.

The automatic control system which causes the ticker transmitter to stop at the correct point in its rotation corresponding to the character which it is desired to print, will now be described more in detail.

As is well known by those familiar with telegraph apparatus, the quotations which it is desired to transmit on a permutation code type of transmitter are prepared by an operator in the form of a perforated tape by means of a keyboard perforator having a key for each character appearing on the type-wheel of the recorder or ticker, each character having a different combination of holes constituting the character selection. In the present system, in addition to the character keys, I employ three function keys, the unison, the tape and the rub-out, the operation of which will be described hereinafter.

The width of the tape permits six holes to be perforated. Of these the top hole, which is designated the "zero" hole, is for the purpose of distinguishing between figures and letters. The zero hole is perforated on all figure characters is not perforated for letter characters. The other five holes are for the purpose of selection or determining the character to be printed. The selection for all characters is shown in Figure 5.

After the perforated tape is prepared by the operator, it is passed through a tape transmitter of the same general type shown in U. S. patent to Benjamin No. 1,298,440. I have, however, made a number of changes and have embodied new features in order to adapt it to my present purposes. The essential features of this tape transmitter are illustrated in the upper portion of Fig. 2. Six reciprocable pins P are employed, one for each hole in the tape, and each pin controls a rocker-arm 100, carrying two-semi-flexible contact tongues *t*, *t*, insulated from each other. For the sake of clearness I have only illustrated one of these rocker-arms. These flexible contact tongues play between marking contacts M and spacing contacts S, the contacts being connected to the respective segments of the selector heads A and B, over which rotate the brush arms 80 and 81, fixed to the transmitter shaft. As the brushes are rotated they join together different sets of segments. The segments are so arranged that there are thirty distinct stop positions during one revolution of the brush arm. Face views of the selector heads are shown in Fig. 4. In the lower portion of Fig. 3, I have shown the segmented face of the heads in developed form and in the upper portion of the figure I have indicated diagrammatically the tape transmitter tongues and cooperating contacts and have indicated the selector head segmented rings to which the contacts are connected.

The tape transmitter tongues marked 1, 2, 3, 4 and 5, are the ones which control the character selection and the stopping of the ticker transmitter. The right hand set of tape transmitter contacts is connected directly to the segments of the "A" selector head, and the left hand set of tape transmitter contacts is connected directly to the segments of the "B" selector head. The character corresponding to each set of segments appears on the diagram just above the developed segmented rings in Figure 3.

When a selection is made in the tape transmitter by certain of the pins P, passing through perforations in the tape indicated at $T^a$, the tongues, which correspond to the pins which passed through the perforations, are moved over against their marking contacts M, while the other tongues remain against their spacing contacts. This selection or arrangement of the tongues prepares a circuit which is completed by the brushes carried on the brush arms 80 and 81 as they come to the set of segments corresponding to the selection set up. The stop magnet 85 is energized by the completion of the circuit through it and causes the stop arm 86 to arrest the rotation of the ticker transmitter shaft 65, with the brushes resting on the line of segments corresponding to the selected character.

The operations which take place will be understood by the following specific examples.

Figure 8 shows the setting of the tongues in the tape transmitter for the selection of the letter D. Below the tape transmitter tongues and contacts is shown the section of the "A" selector head for the character set up in the tape transmitter. By comparing Figure 8 with Figure 3, it will be seen that the segments shown in Figure 8, are in the correct relative position as they actually occur on the selector head. Only the right hand set of tape transmitter tongues and contacts appear in Figure 8.

With the tape transmitter tongues in the position shown in Figure 8, and with the ticker transmitter brushes on the line of segments corresponding to the character selected, there is a circuit from ground on No. 1 tongue of the tape transmitter, through the tongues and contacts of the tape transmitter, connected as shown, to the segments and brushes of the ticker transmitter and through stop magnet 85 to positive battery. This energizes the stop magnet, which stops the transmitter shaft with the brushes resting on the selected line of segments, thereby causing the tickers to print the character selected in the manner previously described.

The selection for the letter Y is 1, 3 and 5 marking. The circuits for this selection are shown in Figure 9 and will be easily understood. The selection for any character on the "A" selector head may be traced through in a similar manner, first setting up the correct selection in the tape transmitter, as shown in Figure 3, and then assuming the selector head brushes to be on the segments for that particular character.

It will be found from an examination of the diagram that there is only one position on the head where the revolving brushes complete a circuit to the stop magnet for any one character set up in the tape transmitter. Each character on the ticker type-wheel appears only once on the "A" selector head.

Figure 4 is a face view of the two selector heads. The brush arms 80 and 81 are opposite each other on the shaft and consequently the brush arm 80 is at the top of the "A" head when the brush arm 81 is at the bottom of the "B" head. Furthermore as the heads face each other, the brushes will rotate thereon in opposite directions as indicated by the arrows.

By referring to Figure 6 showing the developed face of the type-wheel it will be observed that there are two sets of Figures 1 to 8 inclusive, two figure dots and three letter dots. It is desirable, of course, that the ticker transmitter and consequently the tickers being worked from it, shall stop at the first one of the duplicate characters when that character is set up in the tape transmitter. To accomplish this result, I provide the "B" selector head and the second brush arm 81.

The segmented rings of the "B" selector head are shown in developed form in Figure 3 and in the correct position with respect to the "A" selector head and the brush arms. In addition to the duplicate figures and dots, this "B" head has segments assigned to three functions, viz: the "unison dot," the "tape stepper," and the "rub-out", the purpose of which will be explained later. The left hand set of contacts in the tape transmitter is connected to the "B" head, as indicated in Figure 3. Selections are thus made independently on the two selector heads, there being no common circuits, but the same selection is prepared for both heads at the same time.

The selection for the Figure 4 is the same in the two positions, that is, 0, 1, 4 marking. It is obvious then that if the character 4 is perforated in the tape a circuit will be prepared when the brushes reach the fifth position on the "A" head and likewise in the sixteenth position on the "B" head. The ticker transmitter brushes will therefore complete a circuit through the stop magnet 85, in either position and the brush arm will be stopped in whichever position it reaches first.

If the selection for the letter D, that is 1, 4 marking, is set up in the tape transmitter, the ticker transmitter must stop only on the fifth position of the "A" selector head and in no other position on either head. The letter D and Figure 4 differ only in that the latter has an 0 perforation in addition to the 1, 4 perforations on the tape. The means of distinguishing between the nearly similar selections for D and 4 can best be explained by reference to the diagrams of Figure 10.

The selection for the character 4, as set up in the tape transmitter is shown in Figure 10, the selection being 0, 1, 4 marking. By tracing the circuits, it will be seen that the stop magnet 85, can be energized either in the fifth or in the sixteenth position of the brushes. If, however, the zero tongue of the tape transmitter is on the spacing contact, as for the character D, in which the selection is 1, 4 marking, there is no circuit to the stop magnet in the sixteenth position since the conductor leading to the segment 12A is then open.

Similar circuits may be traced for the other duplicate characters. It will be observed that there is no circuit to the stop magnet 85 directly from the segments of the "B" selector head but that the selection circuits, after passing through this head, pass back to the zero tongue of the tape transmitter and then to the last ring on each selector head.

My method of shifting to either letters or figures in printing a character will now be described. A figure character is denoted by a hole punched in the tape in the zero position in addition to the holes denoting the combination for that particular character. This eliminates the necessity of punching a special figure shift selection in the tape before the character selection as was done heretofore.

The circuits controlling the letters and figures shift are shown together with the selection circuits in Figure 2. The position of the zero tongue is controlled by one of the selecting pins P so that when a hole is perforated in the tape at a zero position, the zero tongue is moved against its left hand or marking contact, and when there is no zero hole in the tape, the zero tongue rests upon the right hand or spacing contact.

The seventh tongue, which is shown as the upper tongue, above the zero tongue, is not controlled by any selecting pin, but is mounted on a rocker arm, (not shown) identical with the six pin controlled rocker arms 100, except that it is connected directly with the armature 108 of the operating magnet 110 and oscillates with it. When, therefore, the magnet 110 is not energized the seventh tongue rests on its left hand or marking contact, and when the magnet is energized this tongue is shifted over against its spacing contact. Also as the magnet is energized, the six selecting pins P are withdrawn from the tape, causing the selecting tongues to move over against their spacing contacts. This must be kept in mind in the following explanation.

Suppose a figure character is to be set up in the tape transmitter. The zero pin then passes through the zero hole punched in the tape and consequently the zero tongue is carried over against its marking contact as shown in Fig. 12. Accordingly there is a circuit from ground on the seventh transmitter tongue, through its left hand marking contact, to the left hand coil of the shift control relay 112 to plus battery. Its armature $112^a$ is moved to the left or figures contact 114, and energizes the left hand coil of the master shift relay 90 through a circuit from ground through armature $112^a$, contact 114, and left hand coil of relay 90 to plus battery. The shift control relay 112 also locks itself on the left side through 3000 ohms and its left coil. The armature of the master shift relay 90, being moved against its left hand contact 117, does not energize the shift relays SR on the circuit panels. Consequently these shift relays send out to the tickers the plus polarity required to operate the ticker shift magnets 43 to the figures side.

The circuits for a letter character are similar to those just described, but in this case the armature of the master shift relay 90 is moved over to its right hand contact 118, thus closing a circuit from plus battery, through armature $90^a$, contact 118, shift relay SR to ground. The armature or tongue of relay SR is thus drawn against contact 120, establishing a circuit through tongue of relay SR, tongue and back contact of relay WR, conductor 50, and coil of shift magnet 43 to ground. This impulse causes the armature 42 to shift the arm 37 to the right under the letters platen.

When the tape transmitter magnet 110 is operated to step the tape $T^a$ forward, the circuit from ground in the tape transmitter to the shift control relay 112 is broken by reason of the seventh tongue being moved to its spacing contact. The locking current through the armature tongue $112^a$ however holds the armature firmly on the side to which it was previously moved, until another operating impulse is received from the tape transmitter. This locking of the shift control relay 112 keeps one coil of the master shift relay 90 always energized and insures good operation of the shift relays SR on the circuit panels. The ratio of operating current to locking current in the coils of the shift control relay is about three and one-half to one.

It is necessary to bring the ground connection to the zero tongue through the seventh or operating tongue and its marking contact in the tape transmitter for the reason that as the tape is advanced, the zero tongue, together with the other five selecting tongues, is drawn over to the spacing contact between character selections. Hence if ground was applied directly to the zero tongue, the shift control relay would be energized and drawn over to the right hand contact or letters side, every time the tape was advanced in the tape transmitter. This would be undesirable as the shift levers in the tickers would then be moved back to the letters side between consecutive figure characters. As I have shown the connections, ground is not applied to the zero tongue until the tape transmitter magnet is de-energized and the setting up of the selection is completed.

Upon starting to transmit stock quotations, the type-wheels of all of the tickers must be at the same point. The first character to be transmitted is the unison dot which appears on the type-wheel in front of the letter A. At definite intervals during transmission of quotations the ticker transmitter must be allowed to run freely for four revolutions, thereby causing all tickers to rotate to the unison point, and then starting the operation again by first printing the unison dot before printing further quotations. When transmitting continuously straight quotations any one of the three dots occurring before the letters A, J or S, may be printed, depending upon the position of the last character.

The operation of the "unison function" is as follows:—

A spiral $65^a$ is cut on the shaft 65 of the ticker transmitter. An arm 119, pivoted at 121 to the armature 123 of the unison magnet 124, carries a pin 125 which travels in the spiral $65^a$ when the armature is retracted. With every character printed, the unison magnet is energized, attracting its armature which carries the arm 119 downward, withdrawing the pin 125 from the spiral and the spring $119^a$ then swings the arm 119 to its starting position, thereby bringing the pin back to the beginning of the spiral. When no character is printed the ticker transmitter shaft runs freely and after four complete revolutions the pin has moved along the spiral until the arm 119 has closed the unison contact 126. All of the tickers have likewise run to the unison position. The contact 126, in conjunction with the selection for unison, viz: 1, 2, 3, 4, 5 marking, perforated in the tape and set up in the tape transmitter, prepares a circuit which is completed by the brushes of the ticker transmitter when they reach the line of segments corresponding to the "unison dot." When this occurs the stop magnet 85 is energized, stopping the shaft of the ticker transmitter and causing all tickers to print the unison dot.

The circuits involved in the operation of the "unison function" are shown in Fig. 11 and also appear as part of the entire system illustrated in Figures 1 and 2. It will be seen that although the unison selection, 1, 2, 3, 4, 5 marking, is set up in the tape transmitter, the circuit cannot be completed until the unison contact 126 is closed, which only happens after four free revolutions of the ticker transmitter shaft. The circuit of the unison magnet 124 is closed by the side contact 130 of control relay $R^1$, and consequently the unison contact is kept open when printing other characters than unison. Relay $R^1$ does not operate on the "tape stepper function." Therefore the unison contact closes and remains closed during a group of tape-stepper functions so that it is not necessary to wait for the four free revolutions of the ticker transmitter shaft before the "unison dot" can be printed following a group of tape-steppers.

The group of control relays $R^1$, $R^2$, $R^3$, $R^4$, $R^5$, together with the tape-stepper relay $R^6$ are shown with their circuits in the lower part of Figure 1. After the circuits corresponding to any character perforated in the tape have operated through the tape transmitter tongues and contacts and the ticker transmitter selector heads and brushes to stop the ticker transmitter shaft with the brushes on the energized line of segments, it is necessary to advance the perforated tape the space of one center hole through the tape transmitter, set up a new selection in the tape transmitter and release the shaft of the ticker transmitter so that it can revolve to the line of segments corresponding to the next selected character. This is accomplished by a sequence of operations of the control relays.

When a selection is set up in the tape transmitter and the brushes of the selector heads arrive at the corresponding segments, a circuit is closed from brush $A^3$ of the selector head A, through conductor 84, stop magnet 85, conductor 132, back stop and armature tongue of relay $R^5$ to plus battery.

As the armature of stop magnet 85 is attracted, the arm 86 engages the stop clip 87, thereby stopping the rotation of the ticker transmitter shaft and the selector brushes and causing the selected character to print on the tickers. As the armature of the stop magnet moves toward the magnet, it withdraws the wedge pin 88 and allows the operating contacts 89 to close. This establishes a circuit from positive battery through operating contacts 89, conductor 134, coil of relay $R^1$, left hand or locking coil of relay $R^2$, conductor 135, tongue and back contact of relay $R^4$, conductor 136 and tape transmitter magnet 110 to ground. Relays $R^1$ and $R^2$ and the tape transmitter magnet 110 are therefore energized simultaneously, but relays $R^1$ and $R^2$ having no work to do other than moving their armatures, are operated slightly in advance of the tape transmitter magnet.

Relay $R^1$ opens the circuit at its back contact through conductor 138 and the coil of tape-stepper relay $R^6$ so that $R^6$ cannot be energized while the character is being printed. It also closes its side contact 130, thus preparing a circuit to the coil of the unison magnet 124 on the ticker transmitter. This magnet is not energized, however, until the side contact 140 of relay $R^3$ is closed.

As the armature of relay $R^2$ engaged its left hand contact, it connected stop magnet 85 to ground through conductor 133, conductor 141, back stop and armature tongue of tape-stepper relay $R^6$. The stop magnet will be held in energized position as long as the tongue of relay $R^2$ remains on its left hand, locking contact. This allows the character selection in the tape transmitter to be withdrawn and a new character to be set up. The stop magnet being held in energized condition by the ground applied by relay $R^2$, holds the shaft of the ticker transmitter stationary until the new character selection is prepared in the tape transmitter.

It was noted that the tape transmitter magnet 110 is energized at the same instant as relay $R^1$ and the left hand, locking coil of relay $R^2$. The downward movement of the arm $108^a$ attached to the magnet armature depresses all of the selecting pins P, and causes all of the selecting tongues *t* to move over against their right-hand spacing contacts, thus breaking up the character selection. The arm $108^a$ also rocks the lever 143 and causes the star wheel 145 to advance the tape $T^2$, the distance of one center hole, bringing the perforations for the next succeeding character over the selecting pins.

As previously explained, there is a seventh rocker arm (not shown) like the rocker arm 100, which carries the tape transmitter tongues 7, and which is directly connected to the armature 108 so that it moves with it. The tongue 7 carried by this arm rests against the left hand or marking contact when the magnet 110 is de-energized and is shifted over to the right hand or spacing contact when the magnet is energized. A ground connection is applied to the tongue, as shown in Fig. 12, and the marking contact controls the letters and figures shift in the manner previously explained. The spacing contact is so adjusted that the tongue 7 makes contact with it just as the arm $108^a$ reaches the lowest point in its stroke and the stepping of the tape is nearly completed. This contact will be referred to as the tape transmitter operating contact OC.

As this tape transmitter operating contact closes, it establishes a circuit from ground through tongue 7, right hand or operating contact OC, conductor 146, automatic stop switch 150, conductor 151, coil of relay $R^3$, conductor 152, coil of relay $R^1$, conductor 134, operating contact 89 on the ticker transmitter to positive battery. As the armature of relay $R^3$ is attracted, it closes a side contact 140 which applies a locking ground to its own coil. The operating contact OC in the tape transmitter may now be opened, but the relay $R^3$ will remain energized until its locking circuit is broken by the opening of the operating contact 89 on the ticker transmitter. The closing of the side contact 140 of relay $R^3$ also energizes the unison magnet 124 through the already closed side contact 130 of relay $R^1$.

When the armature of relay $R^3$ is attracted and engages its front contact, it completes a circuit from positive battery, through resistance 153, armature and front contact of relay $R^3$, conductor 154, right hand or release coil of relay $R^2$, conductor 156 and coil of relay $R^4$ to ground. The operation of relay $R^4$, breaks the circuit through its armature tongue and back contact, which had energized the tape transmitter magnet 110.

The operation of relay $R^4$ also de-energizes the left hand or locking coil of relay $R^2$. This allows the current in the right hand or release coil to attract the armature to that side and removes the locking ground from the stop magnet 85. As the armature of the stop magnet falls back against its back stop, the wedge pin 88 opens the operating contacts 89 which breaks the circuit through the coils of the relays $R^1$ and $R^3$, allowing these relays to return to their unoperated position. The release of relay $R^3$ breaks the circuit through the left hand or release coil of relay $R^2$ and the coil of relay $R^4$. The tongue of relay $R^2$ remains on its right hand contact while the tongue of relay $R^4$ returns to its back contact. All relays are now in their normal unoperated positions and are ready for a repetition of the same cycle of operations when the next character is printed.

The de-energizing of the stop magnet 85 also releases the ticker transmitter shaft, allowing the brushes to revolve over the selector heads until they reach the line of segments corresponding to the next character which has been set up in the tape transmitter.

If the new character thus set up in the tape transmitter is the same as the character which has just been printed, there will be a circuit for this second character selection to the stop magnet through the same line of segments on the selector head. This circuit is established for the second character before the ticker transmitter brushes have left the segment upon which they had stopped for the printing of the previous character. Hence when the locking ground is removed from the stop magnet by the movement of the tongue of relay $R^2$ to its right hand contact under the influence of the current in its release coil, as previously explained, the stop magnet 85 is still held energized by the second character selection which supplies a ground connection through the tape transmitter to the $A^3$ selection brush. Relays $R^1$, $R^3$, $R^4$ also remain energized.

It is necessary to release the ticker transmitter shaft and allow the brushes to revolve until they reach the same character selection when they will be stopped and the same character will be again printed.

As the tongue of relay $R^2$ strikes its right hand contact, it completes a circuit from ground through tongue and back contact of relay $R^6$, tongue of relay $R^2$, conductor 157, coil of relay $R^5$, conductor 158, front contact and tongue of relay $R^3$, resistance 153 to positive battery. This energizes relay $R^5$ and breaks the circuit of the stop magnet, thus releasing the shaft of the ticker transmitter and allowing the brushes to revolve until they reach the line of segments of the same character selection when they will be stopped and the second of the repeated characters will be printed. The release of the stop magnet opens the operating contacts 89 and releases all of the relays as previously explained. Although relay $R^5$ receives impulses on all characters its operation is not required except when characters are repeated.

An arrangement of control relays can be provided in place of relay $R^5$ which will prevent the ticker transmitter shaft and the tickers being worked from it from releasing when a character is to be repeated. This arrangement will cause the line 51 leading to the escapement magnet 34 and the press magnet 45 in the tickers to be opened and closed as many times as the character is to be repeated but does not change the polarity on line 51, and therefore does not rotate the typewheel. This causes the press magnet 45 in the tickers to be alternately released and attracted, another impression of the character being obtained each time the magnet is attracted. The ticker transmitter shaft and tickers are released and allowed to revolve only when a different character selection is set up in the tape transmitter. A diagram of these connections is not shown as the method illustrated whereby the typewheel is allowed to revolve between repeated characters is considered preferable.

The automatic stop switch is mounted on the base of the tape transmitter and is provided with a make and break contact 150 having an arm 160 in contact with the tape between the transmitter and the perforator. The tape passes under the end of the arm and when it becomes taut between the perforator punch block and the transmitter pins, the arm is lifted by the tape sufficiently to open the circuit at the contact 150. The ticker transmitter will stop on the selected line of segments, close the operating contact 89 of the transmitter, and energize relays $R^1$ and $R^2$ and the tape transmitter magnet 110. The tape transmitter steps the tape ahead and closes its operating contact OC on the spacing side but beyond this no action can take place because the automatic stop switch is open. When more tape is perforated the switch is allowed to close and the other control relays operate in sequence as previously explained.

During a dull market when quotations are few and are coming in at irregular intervals, it becomes necessary to advance the perforated type with one or more quotations on it from the perforator to the tape transmitter for immediate transmission. As the tape must not be broken, there will be about three and one-half inches of blank tape between the groups of quotations. This blank tape must be stepped through the tape transmitter in order to reach the next quotation but the ticker transmitter and tickers must not be operated while it is being passed through.

The "tape stepper" character which is used between these separated groups of quotations is a blank in the tape, that is, none of the holes are perforated and consequently all of the tape transmitter tongues *t* rest on their spacing contacts. The character designated as "rub-out", which has all six holes perforated and hence all tape transmitter contacts marking, also operates through the same relay circuits as the "tape-stepper" character to advance the tape through the tape transmitter without actuating the tickers.

These control circuits are shown in Figure 13. The selection portion of the circuits appear in Fig. 3, while the relay circuits are shown in Fig. 1. In Fig. 13 I have combined those portions which are in the tape stepper circuits.

Referring to Figure 13, the tape transmitter tongues are shown resting against the spacing contacts as for the tape stepper selection. The spacing contacts of the left hand B set are connected as shown to the two groups of tape stepper segments on the "B" selector head. Tracing through the selection circuit, it will be seen that there is a circuit from ground in the tape transmitter through the contacts and segments and the brush $C^1$ and conductor 160 to the coil of tape stepper relay $R^6$. The circuit from the other side of relay $R^6$ passes through conductor 138, back contact and tongue of relay $R^2$, conductor 161, back contact and tongue of relay $R^3$, to positive battery. Tape stepper relay $R^6$ is therefore energized but the ticker transmitter is not stopped and no character is printed.

Relay $R^6$, when energized, locks itself in an operated position by applying a ground connection to its coil through its armature tongue and front contact. The side contact 162 of relay $R^6$ is also closed by the armature and this closes a circuit to energize the tape transmitter magnet 110, from positive battery, side contacts 162, conductor 163, tongue and back contact of relay $R^4$, conductor 136 to the transmitter magnet and ground. The operation of this magnet advances the tape one center hole through the tape transmitter.

At the end of the stroke of the armature 108, the transmitter tongue 7 is moved against its right hand contact OC, which I have designated the operating contact, and this energizes relay $R^3$, the circuit being from ground, through the seventh transmitter tongue, conductor 146, automatic cut-out 150, conductor 151, relay $R^3$, conductor 152, conductor 155, left hand coil of relay $R^2$, conductor 135, conductor 163, side contacts 162 of relay $R^6$ to positive battery. The breaking of the circuit through the back contact and tongue of relay $R^3$ releases relay $R^6$ from the influence of its locking circuit and its tongue returns to its back contact. The opening of the side contact of relay $R^6$ releases the tape transmitter magnet 110 and also relay $R^3$. All of the relays are thus returned to their unoperated position ready for the next tape stepper impulse.

Exactly the same operation of relays takes place if the "rub-out" selection is set up in the tape transmitter. As there are two groups of tape stepper segments on the selector head, the tape can be stepped forward at a rate which is twice the free revolution speed of the ticker transmitter.

Although the impulse through the right hand or locking coil of relay $R^2$ is not sufficient to throw the tongue of the relay to that side, as a measure of safety I bring the ground connection to the tongue of relay $R^2$ through the back contact and tongue of relay $R^6$. Thus even if relay $R_2$ does operate on the tape stepper function, it cannot operate the ticker transmitter stop magnet as its grounds circuit has been removed by the operation of relay $R^6$.

While printing characters, the pins P are withdrawn from the tape and the tongues *t* of the tape transmitter are moved over to their spacing contacts each time that the tape is stepped ahead. The tape stepper selection is thus set up momentarily each time that the tape is advanced between character selections. To prevent relay $R^6$ from operating at this time, the circuit from the coil of relay $R^6$ is brought through the back contact and tongue of relay $R^1$. Relay $R^1$ operates for every printed character and therefore relay $R^6$ cannot be energized while printing is taking place.

I claim:—

1. An automatic telegraph system, comprising a tape-controlled transmitting apparatus and a typewheel printing mechanism, said transmitting apparatus embodying a selecting device having cooperating movable and stationary contacts, means for selecting and positioning certain of said movable contacts simultaneously with relation to their cooperating stationary contacts in accordance with a code combination determined by the permutations of the perforations in the tape, a segmented circuit controller having circuit connections to said contact device, motor-actuated brushes movable over the segments of said controller, and electro-magnetic means for stopping said brushes at a point determined by a circuit passing serially through a plurality of said segments and contacts predetermined by the selected arrangement of perforations in the tape.

2. In an automatic telegraph system, a tape controlled transmitter including a motor-actuated circuit selector having relatively movable contact brushes and segments, and comprising a plurality of movable and stationary contacts, means for moving them simultaneously into one grouping or another grouping, determined by the arrangement of the perforations in the tape, and a magnet operating to stop the transmitter by including a plurality of said certain segments and contacts connected serially in a circuit and grouped in a manner determined by the particular selection of perforations in the tape.

3. A telegraph transmitter, comprising a plurality of pivoted levers each carrying a contact member, a series of contacts upon opposite sides of said contact members with which they are adapted to engage, a plurality of tape-controlled members operatively connected with said levers to control the movements of said contact members, a selector head having segments electrically connected with said contacts, motor-actuated brushes arranged to travel over said segments and means for stopping the movement of said brushes when they close a circuit through certain of said segments and certain of said contacts predetermined by the selection of said tape-controlled members corresponding with the character perforations in the tape.

4. A telegraph transmitter as set forth in claim 3, said stopping means comprising a magnet arranged to be actuated through circuits including different groupings of said segments and contacts determined by the combinations of tape-controlled members.

5. In an automatic transmitting apparatus for telegraph ticker systems, the combination of tape-controlled contact members, a segmented circuit controller having circuit connections to said contact members, motor-actuated brushes rotatable over the segments of said controller, an electro-magnetic device operating to stop said brushes when a circuit is closed by the brushes through certain of said segments and contact members, the connections between said segments and contacts being arranged to provide two stop positions for each figure character and one stop position for each letter character selected by the combination of perforations in the tape.

6. In an automatic transmitting apparatus as set forth in claim 5, means for advancing the tape through the transmitter without transmitting code impulses, said means responding to an imperforate tape section and also to a series of perforations equal to the combined letter positions and an additional perforation.

7. In an automatic telegraph system as set forth in claim 1, means controlled by a certain combination of perforations in the tape for causing the transmitting apparatus and the typewheel printing mechanism to make several free revolutions without printing and stop at a definite point, then causing the printing mechanism to print a unison character and permitting the transmitter to move to the next succeeding character.

8. A telegraph system as set forth in claim 2, in combination with control relays which cause the transmitter brushes to remain upon the segments at which they were stopped when the next succeeding character or characters perforated in the tape are the same as the preceding character.

9. A telegraph transmitter comprising a perforated tape, code selecting mechanism, embodying a contact-making device having a plurality of pairs of stationary contacts, contact levers each movable between a pair of said contacts, means for selecting and positioning certain of said contact levers simultaneously with relation to their cooperating stationary contacts in accordance with a code combination, a segmented selector disk or face plate having segments divided into the same number of radially arranged groups as there are combinations between said movable levers and said pairs of contacts, a plurality of brushes relatively rotatable with respect to the segmented selector face plate, and electrical connections between said contact levers, said pairs of contacts, the segments of said face plate and said brushes, such that for any one combination of contact levers a complete electrical circuit is obtained at only one of said radial groups of segments.

10. A telegraph transmitter, comprising a plurality of pivoted levers each carrying a contact member, a series of contacts upon opposite sides of said contact members with which they are adapted to engage, a plurality of tape-controlled members operatively connected with said levers to control the movements of said contact members, in combination with printing apparatus provided with figure and letter characters and operatively connected to respond to impulses initiated by said transmitter, means associated with the printer for determining whether a figure or a letter shall be printed, said means being controlled by one of said members, which member is controlled by the presence or absence of an auxiliary perforation in the tape.

11. In an automatic telegraph system, a receiving printing instrument of the step by step type, means controlling the step by step movement of said instrument to determine the printing points, a transmitting apparatus comprising selector mechanism having segmented rings, electrical connections associated with said rings, and brushes engaging said rings and movable relatively thereto to effect the electrical circuits for sending an impulse to stop said controlling means and operate said printing instrument.

12. In an automatic telegraph system, a movable tape having perforations representing pre-determined functions of a transmitting apparatus, mechanism for electrically controlling the transmitting functions, and having circuits controlled by said tape perforations, said functions including the advancement of the code-perforated tape, shifting from letters to figures and vice versa, and selection of the printing point, said functions being effected at regular or irregular intervals.

13. A telegraph transmitter as set forth in claim 3, and a plurality of auxiliary relays and a magnet arranged in associated circuits to cause said motor-actuated selector head brushes to remain upon the segments at which they were stopped while the code-perforated tape is advanced to the next character, and the tape-controlled members are arranged in accordance with the new character selection.

14. The method of controlling a case shift mechanism in a telegraph printer which comprises the step of allotting a shift control condition to each code combination of selecting conditions to control the case shift mechanism.

15. In a printing telegraph system, a printing mechanism having a normal and a case shift position, a selecting mechanism controlling said printing mechanism, a distributor having a plurality of contacts operating to set up code combinations for controlling said selecting mechanism, a case shift mechanism, and means controlled by one of said distributor contacts for establishing an extra case control condition with each of said code combinations for controlling said case shift mechanism.

16. In a combination a printing mechanism; a selecting mechanism controlling said printing mechanism; a distributor having a plurality of contacts controlling said selecting mechanism; a case shift mechanism; an operating magnet for said case shift mechanism; and one of said distributor contacts controlling said magnet independently of said selecting mechanism.

17. In combination, a printing mechanism having a normal and a shift position, means responsive to code combinations of conditions for controlling the operation of said printing mechanism and electro-magnetic means responsive to a condition added to each code combination for controlling the printer to its shift or normal position.

18. In combination, a printing mechanism having a normal and a shift position, means responsive to code combinations of conditions for controlling said printing mechanism, electro-magnetic means responsive to a condition added to each code combination for controlling the operation of said printing mechanism to its shift or to its normal position, and means for maintaining said electro-magnetic means in a fixed position during succeeding code combinations while no change in the shift position is taking place.

19. In a printing telegraph system, means for transmitting code combinations of character selecting conditions, means for transmitting an extra case control condition with each of said code combinations of selecting conditions; and a printing mechanism selectively positioned in accordance with said code combinations of selecting conditions having a plurality of character case printing positions, and responsive to said extra conditions for selecting the character case from which printing is to be effected.

20. In a printing telegraph system, a transmitter, a receiver comprising a plurality of character case printing positions each having a plurality of characters, means controlled by said transmitter for generating code combinations of selecting impulses for simultaneously selecting a character in each case, means controlled by said transmitter for generating an impulse added to each code combination of impulses, and means responsive to said added impulse for selecting the shift or unshift selected character.

21. In a printing telegraph system, a transmitter, a receiver comprising a plurality of groups of characters each group containing a plurality of characters, means controlled by said transmitter for generating code combinations of conditions to simultaneously select a character in each of said groups, and means controlled by said transmitter for generating a condition added to each code combination for selecting one of said groups whereby a selected character in the selected group is printed.

22. In a printing telegraph system, a transmitter, a receiver comprising a plurality of groups of characters each group containing a plurality of characters, means controlled by said transmitter for generating code combinations of impulses to select a character in each of said groups, and means controlled by said transmitter for generating an impulse added to each code combination to select one of said groups whereby a selected character in a selected group is printed.

23. In a printing telegraph system comprising a transmitter adapted to transmit code combinations of selecting conditions together with a case selecting condition added to each code combination, and a receiver having a figure and letter printing case; the method of operation which comprises selecting a figure and a letter case character in accordance with each code combination, and selecting the case from which printing is to be effected in accordance with the corresponding case selecting condition.

24. In a permutation code printing telegraph system comprising a receiver having a plurality of printing cases, the method of operation which comprises adding to each selecting permutation code combination of character selecting conditions, an added selecting condition to select the case from which printing is to be effected.

25. In a printing telegraph system, a receiver comprising a tape having offset figure and letter case printing positions; printing mechanism for said figure case position, printing mechanism for said letter case position, a transmitter for generating character selecting code combination of conditions to select simultaneously a character to be printed in each case position; and means including said transmitter for generating a case selecting condition added to each character selecting code combination to select the case from which printing is to occur.

26. A printing telegraph system, comprising a type-wheel printing mechanism functioning in response to a succession of impulses varying in number with the position of the characters on the typewheel, and a transmitting apparatus under the control of permutation code character combinations operating to transmit the varying numbers of impulses to position the typewheel at the respective desired characters.

27. A printing telegraph system comprising transmitting apparatus controlled by a permutation code perforated tape and receiving printers of the step-by-step type controlled by said transmitting apparatus.

28. In a printing telegraph receiver, a typewheel rotatable step-by-step under the control of line impulses and means controlling the transmission of the line impulses under the control of permutation code character combinations.

29. In a printing telegraph system, a receiving printer having a rotatable typewheel, an escapement device having an actuating magnet energized by line impulses to cause the typewheel to rotate step-by-step in unison with the line impulses, transmission apparatus including an impulse generator and a permutation code type of transmitter co-acting with said generator to control the number of impulses transmitted to the printer.

30. An automatic telegraph transmission system for step-by-step printers, comprising in combination, an impulse generator, a permutation code type of transmitter co-acting with said generator to cause it to stop in the position corresponding to the character to be printed, means to arrest the impulse generator for a definite interval sufficient to cause a character on the printer to be printed and the next succeeding character selection to be set up in the code transmitter, and means to release the impulse generator to permit the rotation of the printers to the next character position.

31. In an automatic telegraph system as defined in claim 30, if the next succeeding character is the same as the last one, means for preparing said succeeding character selection in the permutation code transmitter but then causing the impulse generator to remain stationary thereby preventing movement of the printer typewheels, and means to cause a repeat operation of the printing function in the printers while the typewheels are held stationary.

32. In an automatic telegraph system for step-by-step printers which require free running to bring all of the printers to a given unison point, an impulse generator to supply the line impulses to operate said printers and means for permitting said generator to send a predetermined number of line impulses to the printers and then automatically causing said printers to proceed upon the next printing cycle of operations.

33. In an automatic telegraph system for step-by-step printers which require free running to bring all of the printers to a given unison point, an impulse generator to supply the line impulses to operate said printers, a permutation code transmitter controlling the operation of said impulse generator and means for permitting said generator to send a predetermined number of line impulses to the printers and then automatically causing said printers to proceed upon the next printing cycle of operations.

34. In an automatic telegraph system embodying step-by-step receiving printers, an impulse generator to supply line impulses to said printers, a transmitter of the permutation code type controlled from a manual code selector and controlling the operation of said impulse generator, and automatic means operating to stop said transmitter and said generator when the transmitter has transmitted all of the manually prepared code characters and until a further supply of prepared characters is furnished to the transmitter.

35. A tape printer comprising a selecting mechanism responsive to received code combinations of electrical impulses, a printing mechanism controlled by said selecting mechanism and including a type-wheel having two parallel sets of peripherally arranged characters, a platen coacting with said type wheel to effect printing of either set of characters, and means responsive to one impulse of a code combination for positioning the platen under the desired set.

36. A tape printer comprising a selecting mechanism, printing mechanism controlled by said selecting mechanism including a two-part type wheel having a letters character periphery and a figures character periphery, a platen coacting with said type wheel to effect printing of either set of characters, and means controlled by said selecting mechanism for shifting the platen under either periphery.

In witness whereof, I have hereunto set my hand this 3rd day of November, 1930.

EVAN R. WHEELER.